Figure 1:
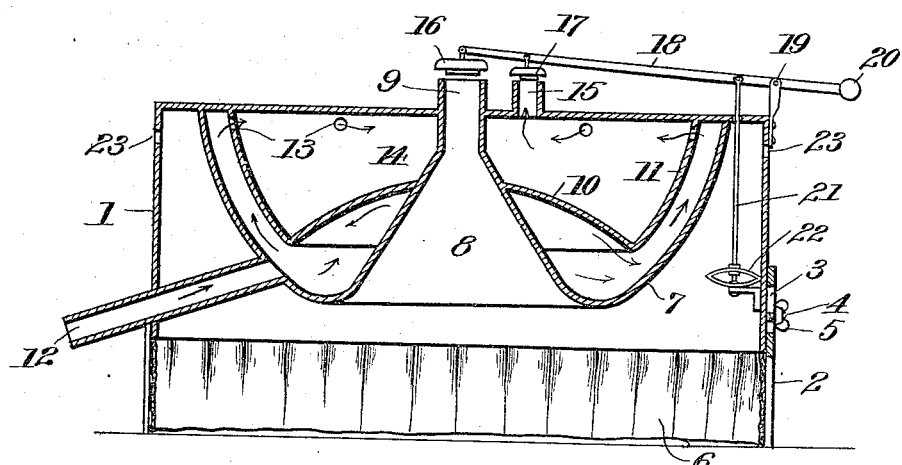

E. MAURER.
BROODER.
APPLICATION FILED AUG. 3, 1915.

1,183,579.

Patented May 16, 1916.

Inventor
Erwin Maurer,
By Frederick V. Winters
Attorney

UNITED STATES PATENT OFFICE.

ERWIN MAURER, OF JAMAICA, NEW YORK.

BRODER.

1,183,579.   Specification of Letters Patent.   Patented May 16, 1916.

Application filed August 3, 1915. Serial No. 43,355.

*To all whom it may concern:*

Be it known that I, ERWIN MAURER, a citizen of the United States, residing at Jamaica, Long Island, in the county of Queens and State of New York, have invented certain new and useful Improvements in Brooders, of which the following is a full, clear, and exact specification.

This invention relates to brooders and has for its object to further improve the construction shown in my prior application, filed July 16, 1915, especially with respect to the ventilation of the compartment for the chicks, and regulation of the temperature in the heating drum.

Another object is to provide the brooder with adjustable legs, whereby the heating drum may be arranged at different heights so as to give better results with different sizes of chicks.

Other objects will appear as the description proceeds.

The invention will be first hereinafter described in connection with the accompanying drawings, wherein similar reference characters are used to designate corresponding parts throughout the several views, and then more specifically defined in the claims at the end of the description.

Figure 2:
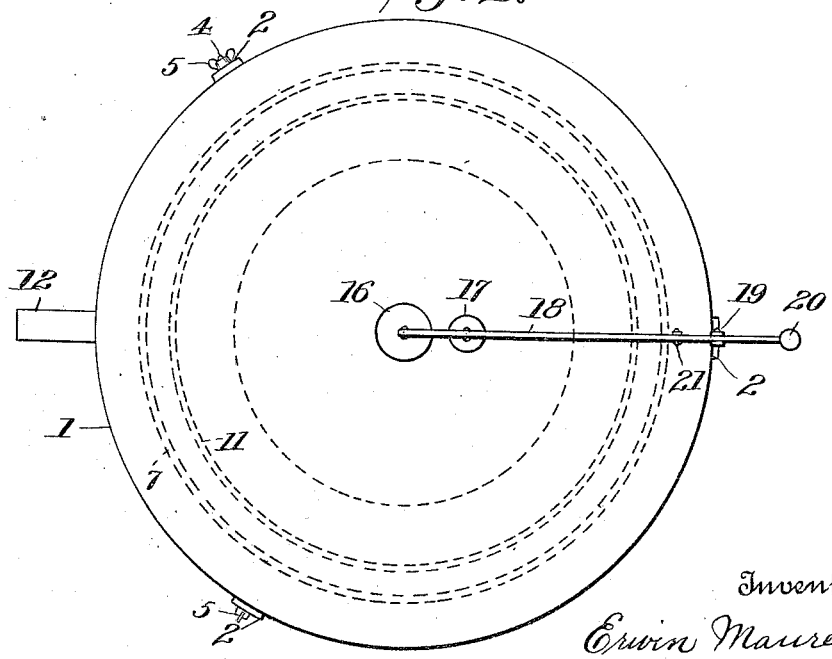

In the drawings:—Figure 1 is a central vertical section through a brooder constructed substantially in accordance with the present invention, and Fig. 2 is a plan view of the same.

The casing of the brooder is preferably made cylindrical, as at 1, with its top closed and its bottom open and supported on legs 2 which are adjustable by means of slots 3 in the upper end portions thereof, pins 4 projecting from the outer wall of the casing 1 through said slots, and thumb nuts 5 fitted on said pins and adapted to clamp the legs in adjusted position to the wall of the casing. The usual curtain 6 depends from the lower edge of the casing and surrounds the space below it.

Within the casing and depending from the top thereof there is arranged a central heating drum of peculiar formation. Said drum consists principally of a pair of dished plates 7 and 10, the former being arranged below the latter so as to provide space for the circulation of heated air which enters through a pipe 12 from any suitable source of heat (not shown). The plate 7 is bowl-shaped and has a central conical portion 8 reaching up through the central portion of the plate 10 and the top of the casing, as at 9.

The plate 10 is convex and forms an arch over the central portion of the plate 7 and around the conical part 8, tending to throw the heat units down upon the bottom plate 7 which is nearest to the chicks within the inclosure of the curtain 6. Surrounding the convex central portion 10 of the upper plate there is an upwardly turned flange 11 arranged parallel to and spaced from the marginal portion of the plate 7, the extreme margins or peripheries of the plate 7 and part 11 both being secured in a suitable manner to the top of the casing 1. Near its periphery, the part 11 is provided with perforations 13, which place the drum in communication with a space 14 between the plate 10, flange 11 and top of the casing 1, and which may be termed a supplemental drum. The top of the casing is provided with another opening or nozzle 15 communicating with the supplemental drum.

The openings 9 and 15 leading respectively to the interior of the casing below the drum, and to the supplemental drum, are designed to be closed by caps 16 and 17, respectively, mounted on a common lever arm 18 which is pivoted or fulcrumed at 19, counterbalanced at 20, and connected by a rod 21 to a thermostat 22 in the casing but outside of the heating drum. The casing has two small openings 23 preferably at diametrically opposite points of its annular wall near its top, as an additional means of ventilation.

In operation, the heated air enters the drum between the plates 7 and 10 through the pipe 12, and after circulating throughout the central portion of the drum below the convex plate 14 and around the cone 8, passes up into the restricted annular space between the marginal portion of the plate 7 and the flange 11. The heated air which collects at the top of this restricted annular passage or space finds its way slowly into the supplemental drum 14 via the perforations 13, so that the main heating drum is insulated from the top of the casing by the warm air in the supplemental drum. When the temperature in the casing becomes too high, the thermostat 22 causes the caps 16 and 17 to be raised from the openings 9 and 15, respectively, thus permitting the surplus heat to escape.

It is obvious that by providing adjustable legs, the casing may be easily set at different heights from the ground so as to best suit different sizes of chicks. By ths means, as the chicks grow, the bottom of the heating drum may be gradually raised, keeping it always practically the same distance above the heads of the chicks and thus producing the best possible results.

Having thus described my invention, what I claim as new and desire to secure by Letters Patent of the United States is:—

1. In a brooder, the combination with a casing, of a heating drum having a conical passage running through it and opening at the top of the casing, a supplemental drum above the main heating drum and communicating therewith, said supplemental drum having an outlet opening in the top, means for supplying heated air to the main heating drum, and caps for said openings at the top of the conical passage and in the top of the supplemental drum controlled by a single thermostat.

2. In a brooder, the combination with a casing, of a heating drum therein, said drum having an annular wall and comprising an enlarged central portion and a restricted annular passage extending upwardly from the enlarged central portion and within the annular wall of the drum, a supplemental drum arranged above the enlarged central portion of the main heating drum and surrounded by the upper portion of the restricted passage, means of communication between said supplemental drum and the upper portion of said restricted passage, means for supplying heated air into the enlarged central portion of the main drum, and an outlet from the supplemental drum.

3. In a brooder, the combination with a casing, of a heating drum therein, said drum having an annular wall extending to the top of the casing and comprising an enlarged central portion and a restricted annular passage extending upwardly from the enlarged central portion and within the annular wall of the drum to the top of the casing, a supplemental drum arranged above the enlarged central portion of the main heating drum and surrounded by the upper portion of the restricted passage, being bounded at the top by the top of the casing, means of communication between said supplemental drum and the upper portion of said restricted passage, means for supplying heated air into the enlarged central portion of the main drum, and an outlet from the supplemental drum through the top of the casing.

In testimony whereof I have signed my name to this specification.

ERWIN MAURER.

Copies of this patent may be obtained for five cents each, by addressing the "Commissioner of Patents, Washington, D. C."